United States Patent [19]

Freeman et al.

[11] 4,243,154
[45] Jan. 6, 1981

[54] SEED PLANTING MACHINES

[75] Inventors: Carl D. Freeman, Idaho Falls; Melvin G. Grover, Rigby, both of Id.

[73] Assignee: Logan Farm Equipment Co., Inc., Idaho Falls, Id.

[21] Appl. No.: 56,550

[22] Filed: Jul. 11, 1979

Related U.S. Application Data

[60] Division of Ser. No. 851,921, Nov. 16, 1977, which is a continuation-in-part of Ser. No. 676,836, Apr. 10, 1976, abandoned.

[51] Int. Cl.³ .............................................. A01C 9/02
[52] U.S. Cl. .................................................... 221/253
[58] Field of Search .................. 221/253, 254; 111/34, 111/52, 80, 77

[56] References Cited

U.S. PATENT DOCUMENTS

| | | | |
|---|---|---|---|
| 3,570,424 | 3/1971 | Wigham | 221/253 |
| 3,690,511 | 9/1972 | Wigham | 221/253 |
| 4,008,826 | 2/1977 | Carrée | 221/253 |

FOREIGN PATENT DOCUMENTS 2604752 8/1977 Fed. Rep. of Germany ............. 111/34
1915927 10/1970 Fed. Rep. of Germany ............. 111/34

Primary Examiner—Allen N. Knowles
Attorney, Agent, or Firm—Arthur H. Swanson

[57] ABSTRACT

A potato seed planter in which seeds are loaded into cups on an endless conveyor from a hopper of a seed receptacle. The conveyor is driven on upper and lower sprockets and arranged on the receptacle with the cups in two parallel rows in staggered constant relationship and moving upwardly through the hopper for seed loading. The cups pass around the upper sprocket, invert and enter a contoured tube thereat and descend in an attached discharge tube to a furrow. The cup bottoms are inclined transversely and support the seeds in their descent against the wall of the discharge tube. At the bottom the seeds are discharged from the planter and guided by the transversely inclined cup bottoms are deposited one by one alternately from one row and then the other in the furrow with precision heretofore unacheived. The planter further comprises a wheeled frame and one or more, attached, laterally extending, flexible frames upon which the receptacle is supported. The receptacle is size adjustable and the planter is adaptable to plant in several rows simultaneously.

6 Claims, 15 Drawing Figures

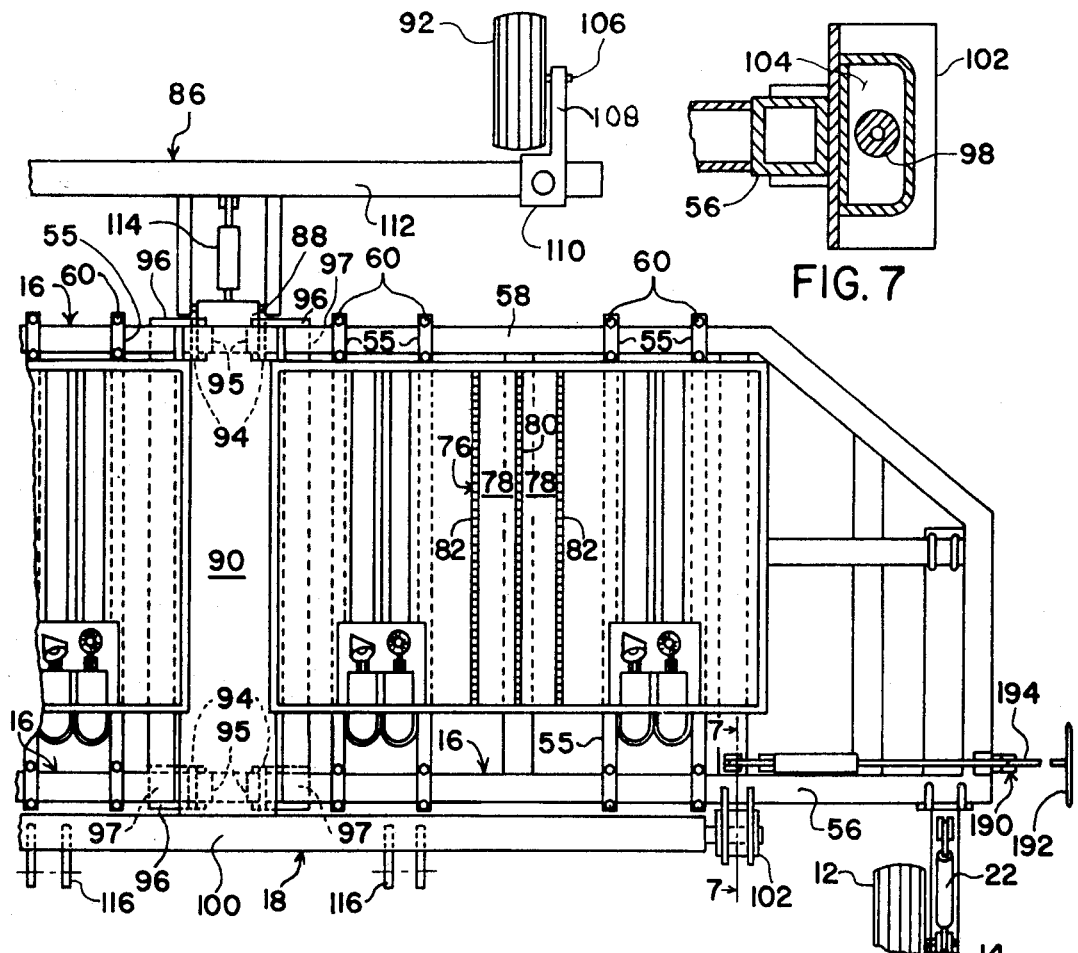

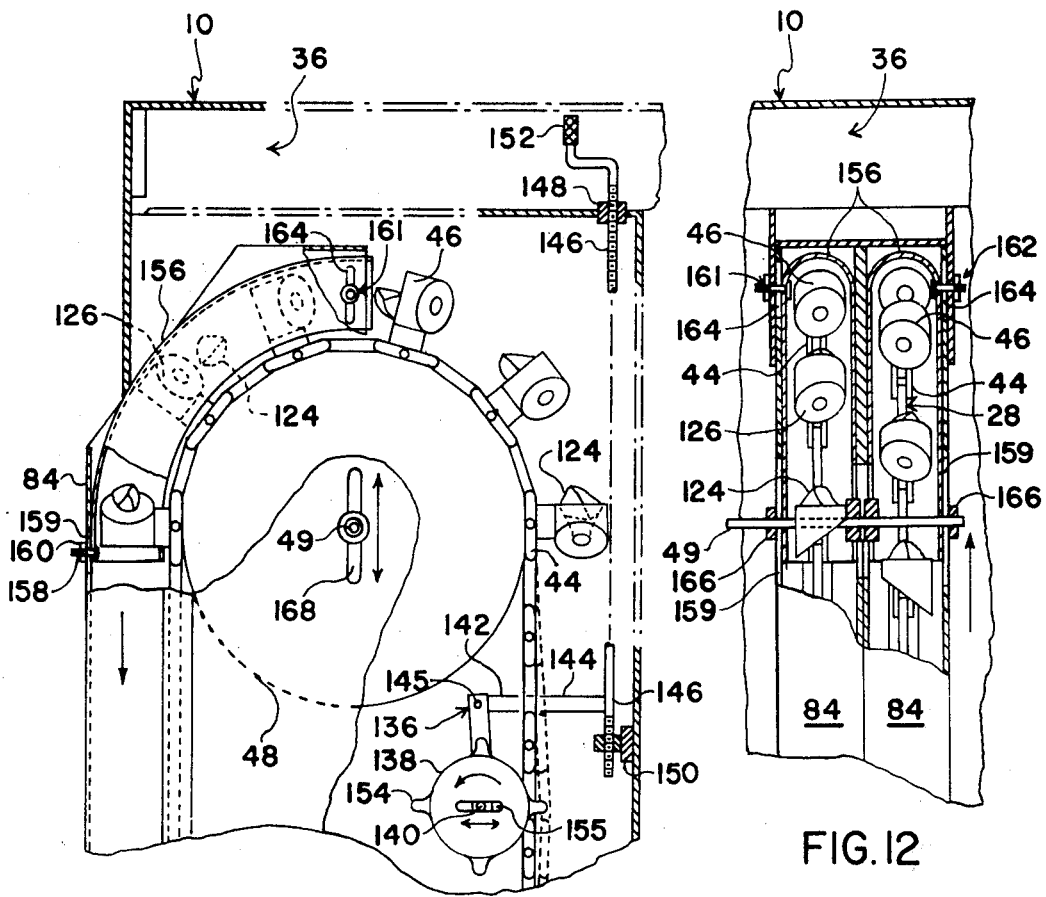

SEED PLANTING MACHINES

CROSS-REFERENCE TO RELATED APPLICATIONS

This application is a divisional of our pending patent application Ser. No. 851,921, filed Nov. 16, 1977, which was a continuation-in-part of our patent application Ser. No. 676,836, filed Apr. 10, 1976, now abandoned.

BACKGROUND OF THE INVENTION

1. Field of the Invention

This invention relates to seed planting machines and in particular to an improved potato planter that is adapted to deposit seeds in one or more furrows with precision at high ground speed in several furrows simultaneously.

2. Description of the Prior Art

Various forms of potato seed planters have been proposed in the prior art. Typically, a prior art potato seed planter is drawn over the ground by a tractor, a plow attached to the planter opening a furrow or crop row into which seeds are dropped by a plurality of circulating planting devices or elevators provided with pick-up elements or cups from a seed receptacle or hopper. In one such form of potato planter, as illustrated in German Pat. No. 565,279, issed on Nov. 28, 1932, parallel seed belts arranged side by side dispense seeds to the same furrow by attached cups. Such a parallel arrangement is desirable in that it allows the cups to move through the hopper at a lower speed for the same ground speed compared with planters equipped with a single belt only thereby enabling more careful treatment of the seeds in the hopper. Such planters have the disadvantage, however, that due to the configuration of the cups the seeds are allowed to drop essentially unguided into the furrow as a result of which planting is irregular. The seeds fall on the flanks of the furrow from where they fall down haphazardly and as a result do not come to rest in a straight line, nor are they spaced uniformly in their rest positions.

Potato planters have also been proposed which are adjustable to vary the spacing between crop rows by the inclusion of size adjustable seed receptacles or hoppers, mounted on a wheeled frame. As illustrated in U.S. Pat. No. 3,683,829, W. S. Herrett, the spacing of the hoppers and the planting mechanisms carried thereon relative to one another are adjustable to various crop row spacings by sets of mutually adjacent sloping bottom walls of mutually adjacent hoppers which are freely straddled by a ridge plate in slidable relation thereon. Such an arrangement although workable for adjustment of the size of the receptacle or hopper, is difficult to operate due to high friction forces present between the sliding plates.

Potato planter proposals have been made also concerning other aspects of the planting. In particular, wheeled frames upon which receptacles and circulating planting devices or elevators are supported while planting, as illustrated in U.S. Pat. Nos. 3,322,428, C. M. Cooley and 3,132,610, C. C. Hoffman, include additional, flexibly attached frames upon which seed hoppers and planting mechanisms are mounted so that many crop rows can be planted simultaneously. Such arrangements although adjustable to plant under various ground conditions are incapable of maintaining the planting depth relatively constant under uneven ground conditions without the inclusion of complicated structure involving many connected parts.

SUMMARY OF THE INVENTION

Among the objects of the present invention is the provision of a planter having a circulating planting device for delivering seeds to a crop row or furrow that is operable to deposit the seeds in the furrow precisely, in single file, in a straight line, with uniform spacing between seeds.

A further object of the invention is to provide for a planter having a circulating planting mechanism for delivering seeds from a seed receptacle to a crop row or furrow in a seed conveyance or cup having a bottom surface that is inclined transversely with respect to the furrow, or to a plane containing the center-line of the furrow, for controlling and guiding the deposit of a seed carried thereby into the furrow.

A further object of the invention is to provide a planter of the character described in which a plurality of seed cups are arranged on a vertical circulating planting device or elevator in two parallel rows in a side by side staggered relationship that is maintained constant and in which the transversely inclined bottom surface of the cups of one row converge with respect to the corresponding transversely inclined bottom surfaces of the cups in the other row whereby seeds are alternately deposited under control of the transversely inclined cup bottom surfaces one by one from each row into the furrow in a straight line and uniformly spaced apart therein.

A still further object of the invention is to provide a planter of the character described in which the transversely inclined bottom surfaces of the cups of one of the parallel rows of cups diverge with respect to the corresponding transversely inclined bottom surfaces of the other row whereby seeds are deposited with similar precision in two rows in a single furrow, one on each side of the furrow.

A further object of the invention is to provide a planter of the character described which is operative to effect precision planting of seeds in one or more furrows at a significantly higher ground speed without a corresponding increase in the cup speeds through the associated hoppers.

A further object of the invention is to provide for use with a planter having a vertical circulating planting device or elevator for delivering seeds from a seed receptacle to a crop row or furrow, seed conveyances or cups adapted to be mounted on the elevator for receiving seeds from the receptacle, the interior of said seed conveyances having the shape of a frusto conical section, the seed conveyance having an opening in the top for receiving the seed, an opening in the bottom for eliminating debris picked up in the receptacle, and having an inclined bottom surface that as disposed with respect to the elevator is adapted to be inclined in either direction transversely to the vertical axis thereof.

A further object of the invention is to provide a planter of the character described in which the seed hoppers are sections of size adjustable seed receptacles which can be adjusted to expand or contract, while simultaneously adjusting the planter mechanisms to vary the crop row spacings.

A still further object of the invention is to provide a seed planter of the character described in which the seed receptacles and associated hoppers and planting mechanisms are mounted on flexible frames which are flexibly connected to a wheeled frame and supported on a ground engaging drive wheel attached to the flexible frame whereby the planting depth, even under uneven ground conditions during seed planting operation is maintained relatively constant.

In accomplishing these and other objects there is provided according to the present invention a potato seed planter in which seeds are loaded from a hopper of a seed receptacle into spaced cups carried on a circulating planting device comprising vertically positioned endless chains driven in pairs on upper and lower sprockets for upward movement through the hopper for loading and downward movement for deposit of the seeds in a furrow. The cups on each chain are staggered with respect to cups on the other, both chains being driven by a common shaft whereby cups of each chain maintain a constant relationship with cups on the other. Each loaded cup inverts as it passes around the upper sprocket, and guided in its flight by a contoured tube smoothly drops its seed on the bottom of the immediately preceding inverted cup, and descends to the bottom of the machine in a guide path provided by a surface providing means such as through a vertical discharge tube. The cup bottoms have transversely inclined planar surfaces, the bottom surfaces of the cups on one chain, in one embodiment of the invention, converging with respect to the correspondingly inclined bottom surfaces of cups on the other. As the cups pass around the lower sprockets the seeds are guided by the transversely inclined cup bottom surfaces for controlled deposit in the furrow, alternately one by one from a cup on one chain and a cup on the other, thereby achieving uniformly spaced seed deposit in a straight line with a precision heretofore not attainable.

In another embodiment of the invention the transversely inclined planar bottom surfaces of the cups on one chain diverge with respect to the corresponding inclined bottom surfaces of the cups on the other whereby seeds are deposited in the furrow in a similar manner and with similar precision but in two rows therein instead of one, one on each side of the furrow.

The planter further includes a wheeled frame and one or more attached, laterally extending, flexible frames, upon which the seed receptacle is supported. The receptacle is size adjustable and the hoppers together with their associated circulating planting devices are movable relatively to each other to vary crop row spacings. The planter is adapted to plant several rows simultaneously.

BRIEF DESCRIPTION OF THE DRAWINGS

FIG. 5 is a plan view of the invention with the receptacles mounted thereon, some parts being omitted to show more clearly the relationship of the various frame parts and support members;

FIG. 6 is front elevational view of the frame and frame parts of FIG. 5, parts broken away;

FIG. 7 is a section taken on line 7—7 of FIG. 5;

FIG. 11 is a side elevation, partially sectioned, of the top portion of the invention showing a form of conveyor chain shaker assembly mechanism, a portion of the circulating planting device or elevator conveyor chain or belt and some of the seed cups traveling over and around an adjustable upper or return sprocket and into an adjustable curved or contoured tube;

FIG. 12 is an end elevation viewed from the rear, partially sectioned and with parts broken away, of a preferred dual row circulating planting device or elevator of FIG. 11, the loaded seed cups traveling upwardly from a seed hopper and entering the curved or contoured tube in staggered, side by side relation;

DESCRIPTION OF THE PREFERRED EMBODIMENTS

Figure 1:
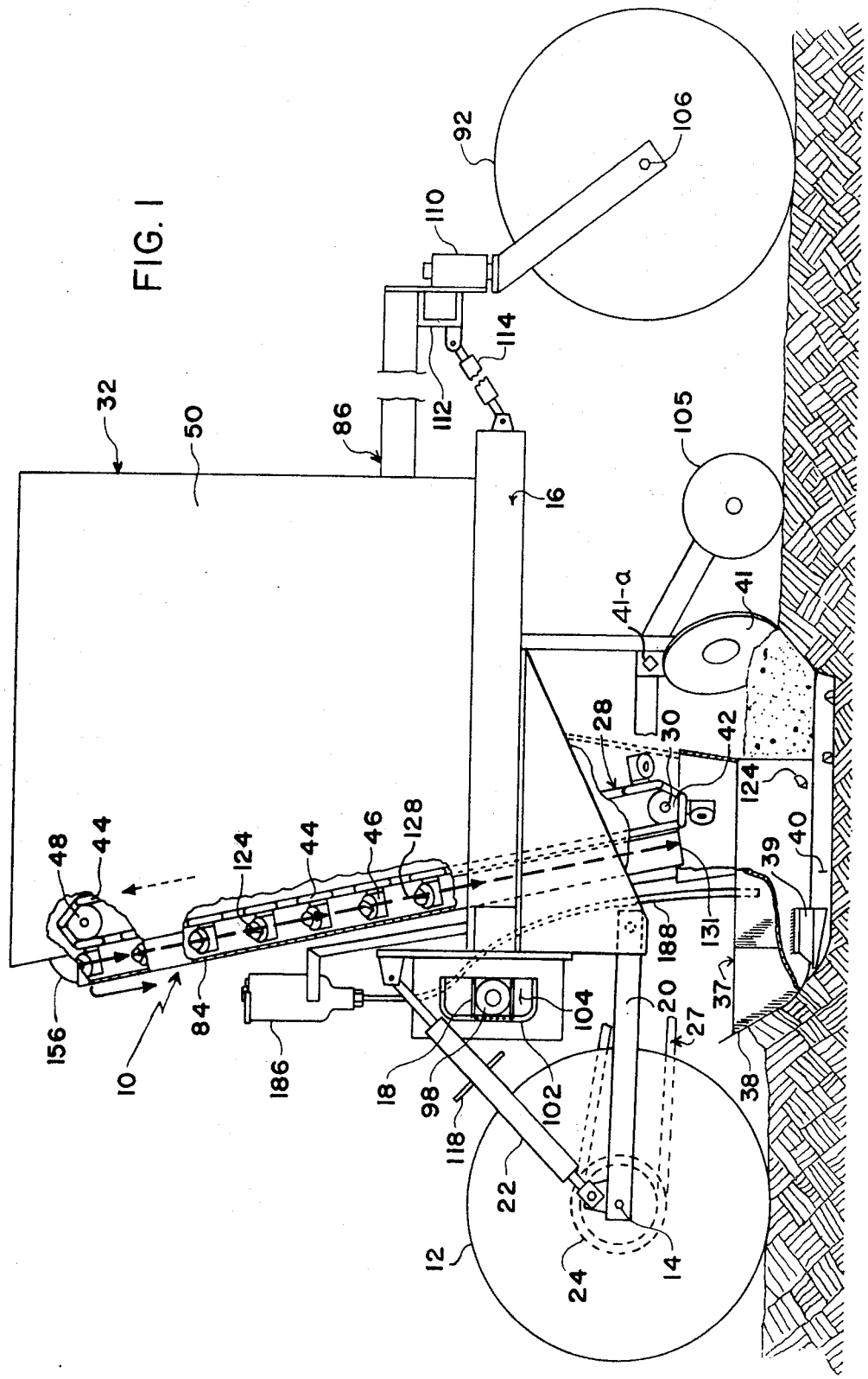
FIG. 1 is a side elevation of the invention, parts broken away, shown in position planting seeds.

For a detailed description of the invention, reference may be had to FIG. 1, in which a planter, in particular a potato seed planter 10 is shown in position to plant seeds. Planter 10 comprises a drive wheel 12 rotating on an axle 14, adjustably linked to a flexible frame 16, as best seen in FIG. 5, on a main frame 18, best seen in FIGS. 6 and 7, by means of a swivel support arm 20 and an adjusting crank or turnbuckle 22. A drive sprocket 24 on axle 14 rotates with drive wheel 12 and is drivingly engaged to a sprocket 26, either directly as in FIG. 1, or through a transmission system 27 including a second sprocket, appropriate idler pulleys and a transmission chain, as in FIG. 2, of a circulating device or elevator 28. Circulating planting device 28 comprises a drive shaft 30 journaled in a housing 32 (FIGS. 2 and 4), the latter being an extension of a hopper or hopper section 34 of a size adjustable receptacle 36 and a set, preferably a pair of endless conveyor chains or belts 44,44.

A V-shaped furrow forming device, planting drill or shoe 37, which is bottom mounted to housing 32, has a plow share 38 abutting the front end at the apex of the V of shoe 37 and a grooving device or furrow centerline forming frog 39 mounted on the inside of the V immediately behind the apex. Center lining frog 39 has a V-shaped bottom portion which extends a short distance below the bottom of shoe 37 for forming a V-groove 40 in the ground at the bottom of the furrow. Frog 39 is centered in the V of shoe 37 whereby groove 40 is formed in the center of the furrow which aids in aligning seeds when planted.

Figure 2:
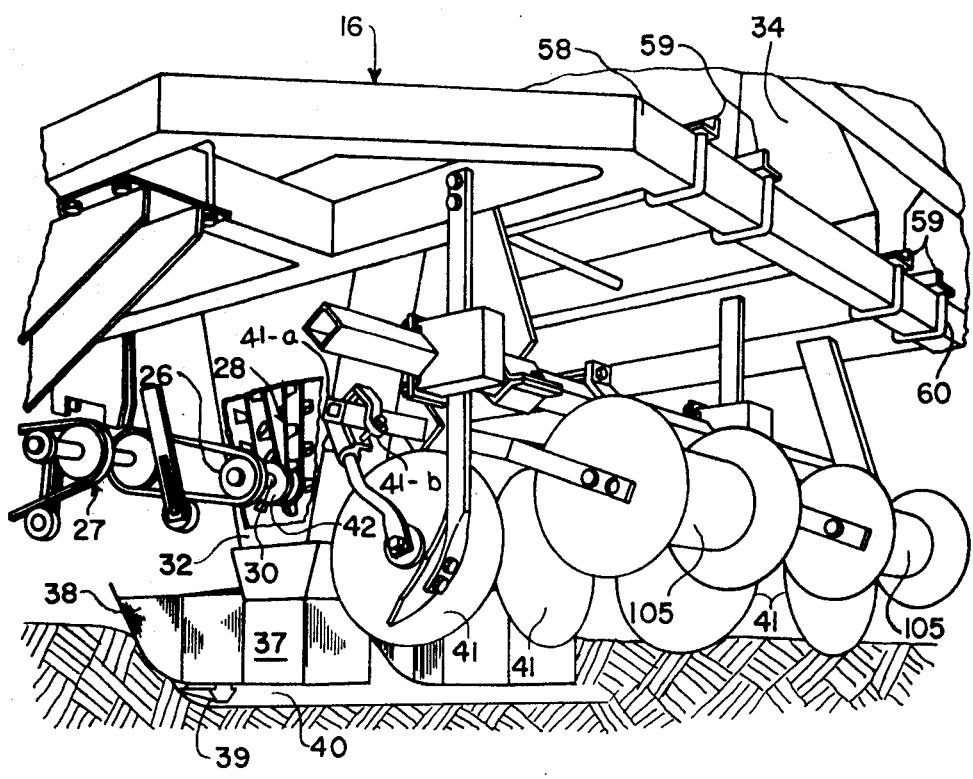
FIG. 2 is a perspective view of a portion of the underside of a planter incorporating the invention.

One or more hilling or harrow discs 41 are adjustably mounted on a tool bar 41-a on the bottom of planter 10 and adjusted in position immediately behind shoe 37 by means of a bracket clamp 41-b, is best seen in FIG. 2, so that seeds deposited in groove 40 are covered with dirt as quickly as possible. Discs 41 should be positioned to insure that when planter 10 is operating at the desired speed, dirt will be pushed or hilled right up to the back of shoe 37 to aid in maintaining accurate and uniform spacing of seeds in groove 40 in the furrow.

Journaled shaft 30 rotatably supports a lower multiple sprocket 42 in housing 32 which, in turn, drivingly supports the endless chains or belts 44, 44 of circulating planting device 28. Each chain or belt 44 carries a plurality of seed conveyances in the form of cups or buckets 46 and extends about and circulates around lower sprocket 42 and an upper or return multiple sprocket 48 rotating on an upper idler shaft 49. Conveyances or cups 46 are arranged side by side in staggered constant relation in parallel rows, as best seen in FIG. 12.

Figure 3:
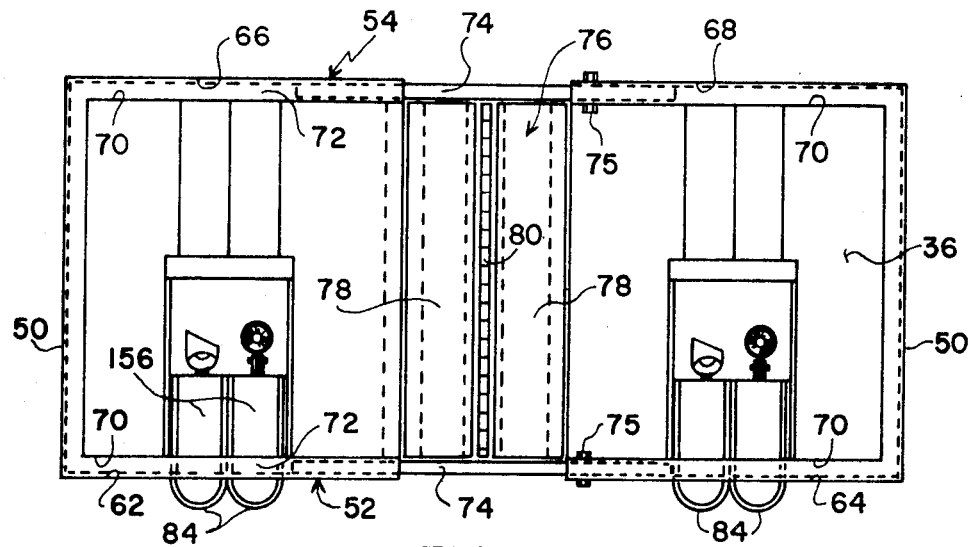
FIG. 3 is a plan view of the size adjustable, seed carrying receptacle and hopper sections of the invention, some parts being omitted for clarity.
Figure 4:
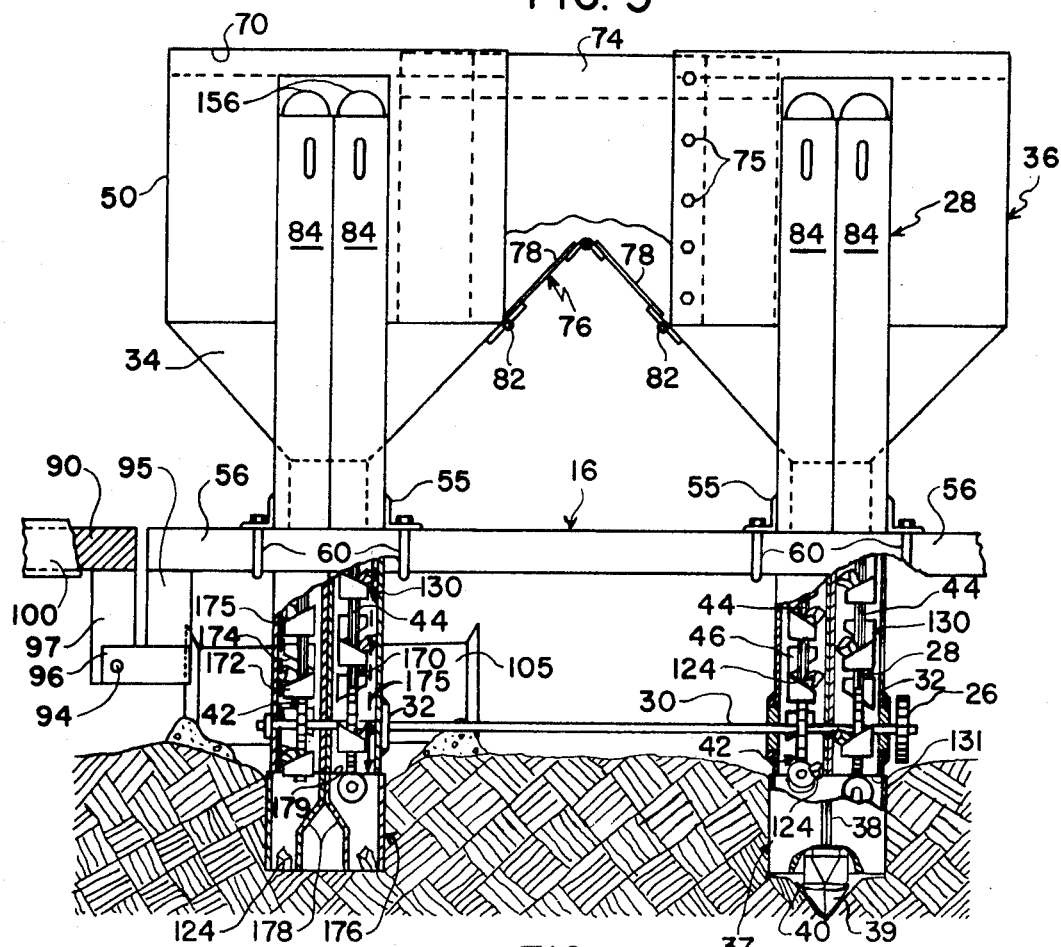
FIG. 4 is a composite, front elevation of a preferred embodiment of the invention (right side) and an additional embodiment (left side) parts broken away.

Turning now to FIGS. 3 and 4, size adjustable seed receptacle 36 will be described. Receptacle 36 is generally rectangular in construction having two spaced apart, vertical sidewalls 50 connected by an extensible front wall 52 and an extensible rear wall 54. Receptacle 36 is secured, as best seen in FIG. 5, to flexible frame 16 on rearwardly extending angle rail supports 55 which extend between the front and rear rails 56, 58 of frame 16 being releasably fastened to rails 56 and 58 by respective U-bolt clamps 60.

Front and rear walls 52, 54 are similar in construction and comprise aligned, spaced upstanding fixed wall portions or plates 62, 64 and 66, 68 respectively, connected to a respective sidewall 50, as seen best in FIG. 3. A flange 70 is formed in the top portion of each fixed plate 62, 64, 66, 68 thereby providing a track or slide recess 72 in each said fixed plate. A connector or extension plate 74 is positioned in each wall 52, 54 between each pair of front 62, 64 and rear 66, 68 fixed walls, each plate 74 being fixedly attached on one of its sides to front plate 64 and rear plate 68 by clamps or bolts 75 and slidably engaging plates 62, 64 in recesses 70 thereof on its opposite side.

Hoppers or hopper sections 34 are integrally connected to receptacle 36 along the bottom edges of sidewalls 50 and the corresponding edges of front and rear fixed wall plates 62, 66 and 64, 68 respectively, and to each other by a folding bottom floor 76. Folding floor 76 comprises a pair of rearwardly coextending floor plates 78 connected together on mutually adjacent sides by a continuous, central hinge 80. Folding floor 76 is attached to hoppers 34 by connecting hinges 82 on mutually opposite sides of floor plates 78.

To adjust the size of receptacle 36, for example, to increase its size, it is only necessary to release one set of U-bolts 60, preferably those of the hopper 34 on the left in FIGS. 4 and 5 which releases left hopper 34 and leaves it free to be slidably moved to the left or right on rails 56, 58. When left hopper 34 is moved, say, to the left, floor 76 unfolds on central hinge 80, floor plates 78 swing downwardly on side hinges 82 and fixed wall portions or plates 62, 66 move leftward sliding on connector or extension plates 74 in recesses 72 of flanges 70 and receptacle 36 is enlarged or expands. Alternatively, right hand hopper 34, if its clamps 60 are released, can be moved to the right with the same result or, conversely, if it is desired to reduce or contract receptacle 36, right hand hopper 34 can be moved leftwardly, in which event floor 76 will fold on central hinge 80, floor plates 78 will swing upwardly on hinges 82 and connector or extension plates 74 will extend into recesses 72 of flanges 70 of plates 62, 66 and receptacle 36 is reduced in size. It will be appreciated, therefore, that if either hopper 34 is moved away from or toward the other, plates 74 retract from or extend into recesses 72, floor 76 correspondingly unfolds or folds and receptacle 36 expands or contracts. In addition, since planting devices 28 are attached by mounting on receptacles 36 and hopper 34, when the latter move, planting devices or elevators 28 move with them. Thus when receptacle 36 is enlarged, planting shoes 37 and plow blade 38 spread apart and the distance between the furrows, i.e., the crop rows, is increased. Conversely, when hoppers 34 are moved toward each other, shoes 37 and plow blades 38 also move toward each other and the crop row spacing is narrowed.

Referring now to FIGS. 5 through 7, certain additional features of the present invention will be explained and described, one of which comprises an additional rearwardly extending hinge frame 86, seen also in FIG. 1, which is connected to main frame 18 by a lateral pin hinge 88 on the rear platform 90 of frame 18. Hinge frame 86 pivots on pin hinge connector 88 and is supported on one or more swivel or trailing wheels 92, and as will be later explained, provides substantial support for flexible frame 16 and receptacles 36 when planter 10 is being transported over the road to the planting field.

Drive wheel 12, attached to flexible frame 16 by means of swivel support arm 20 and height adjustment crank or turnbuckle 22, as previously mentioned, supports frame 16 above the ground and rotates by engagement therewith when towed by a tractor (not shown) to provide the power required to operate circulating device or elevator 28 and form the planting furrows including center grooves 40 therein.

Flexible frame 16 and main frame 18 are flexibly connected by main side hinges 94 in the fore and aft vertical struts 95 extending below platform 90 and the fore and aft trunnions 96 in the lower ends of the frame struts 97 extending below front and rear frame 16 rails 56, 58, and in the front by a roller 98 formed on the end of the front beam or rail 100 of frame 18 movably engaged in an enclosure 102 on front rail 56 of flexible frame 16 in the vertical elongated, substantially rectangular, interior passage 104 therein, as best seen in FIG. 7. From the foregoing, it can be seen that when planter 10 is operated on uneven terrain, frame 16 pivots or flexes on hinges 94 and enclosure 104 moves up or down over roller 98, or conversely depending on the terrain, roller 98 may move up or down in interior passage 104 of enclosure 102. Moreover, as best seen in FIGS. 5 and 6, since virtually the entire planting apparatus, including hopper sections 34 receptacle 36, circulating planting device or elevator systems 28, planting shoes 37, hilling discs 41, seed embracing surface providing vertical discharge tubes 84 and any other additional equipment, for example, the compacting drums or rollers 105 (FIGS. 1 and 2), is mounted on or carried by flexible frame 16, planting at constant, predetermined depths regardless of ground level variations can readily be accomplished. It will also be appreciated that side hinge connections 94 in trunnions 96 permit frame 16 to move about the axis of said hinges independently relative to both main frame 18 and rear frame 86. In addition, by placing the hinge points below the respective frames in struts 95 and 97, the hinging axis is placed closer to the furrows thereby stabilizing shoes 37 during planting and insuring the maintenance of constant depths.

Rear hinge or support frame 86, supported on one or more trailing or swivel wheels 92 roates on an axle 106 in one end of swivel arm 108, the opposite end of which swivels in a housing or swivel connector 110 on the lateral rail member 112 of hinge frame 86.

In transporting planter 10 over the road, or between crop rows from the end of one to the beginning of the next, it is necessary to raise planter 10 above the ground to insure shoes 37 are clear. In the present invention this is accomplished with an actuating device, for example, the double acting hydraulic cylinder 114, best shown in FIGS. 1 and 5, which is mounted on the rear of frame 18, on the rear platform 90, as shown in FIG. 5 and connected to lateral rail member 112 of rear hinge frame 86. Hydraulic power, as from the tractor vehicle (not shown), energizes cylinder 114 actuating it which extends and raises the rear end of planter 10 sufficiently to lift drive wheel 12 above the ground. Planter 10 is supported in this position on swivel wheel 92 and the front end of frame 18 on a two point hitch 116 thereon, to which the tractor vehicle is connected and in which position it may readily be transported to the planting site. Once at the planting area planter 10 is brought into position and aligned for planting, after which cylinder 114 is once again actuated to lower shoes 37 to the ground to begin planting. Since devices such as cylinder 114 and its associated power supply lines and the like are well-known and conventionally used in the agricultural arts, further detail and description thereof is deemed unnecessary to a complete understanding of the invention.

As previously mentioned, planting in uneven ground is often necessary. In these instances, uniform planting depths are difficult, if not impossible to achieve which adversely effects crop yields at harvest time. With the use of the present invention, however, particularly through use of lowered flexible connections 94 and 96 between main frame 18 and flexible frame 16 in struts 95 and 97 and roller 98 engagement in enclosure 102, planting operations can now be performed with markedly greater efficiency since planting shoes 37 are more stable and planting of virtually every seed at substantially the same depth even in uneven terrain is assured. In addition, by means of turnbuckle 22, the position of drive wheel 12 relative to frame 16 can also be adjusted for planting at any desired predetermined depth. To achieve the aforesaid condition, turnbuckle 22 is elongated by turning the crank or handle 118, which raises frame 16 together with planting shoe 37 and blade 38. Reverse turning of crank 118 lowers plow blade or share 38 and shoe 37 so that a deeper furrow may be cut, as best seen in FIG. 1.

Figure 10:
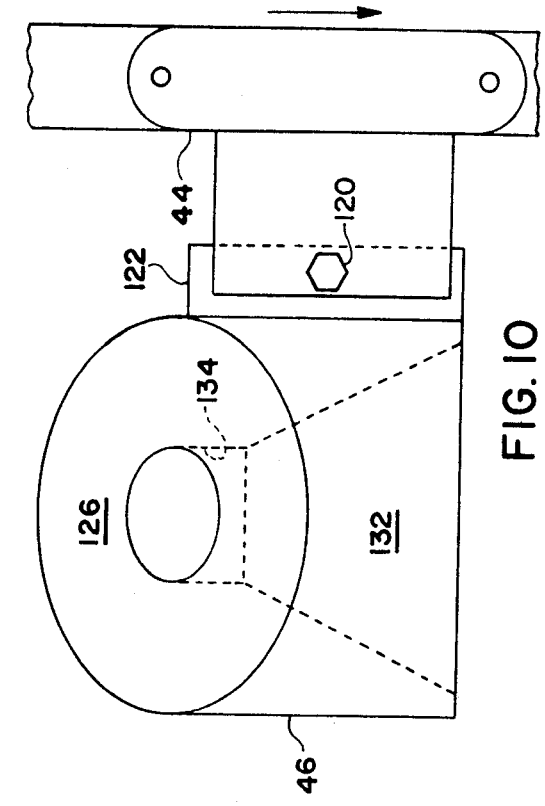
FIG. 10 is an end elevation of the seed conveyance or cup of FIG. 8.
Figure 9:
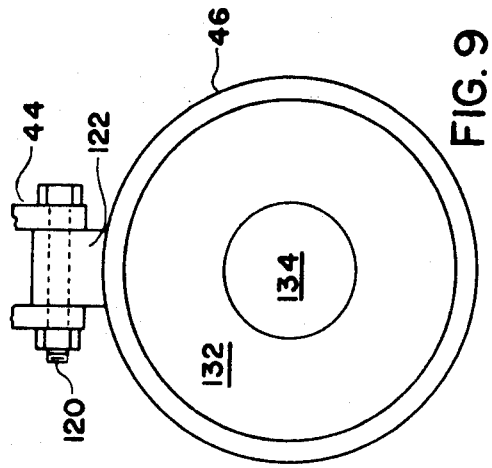
FIG. 9 is a bottom plan view of the seed conveyance or cup of FIG. 8.
Figure 8:
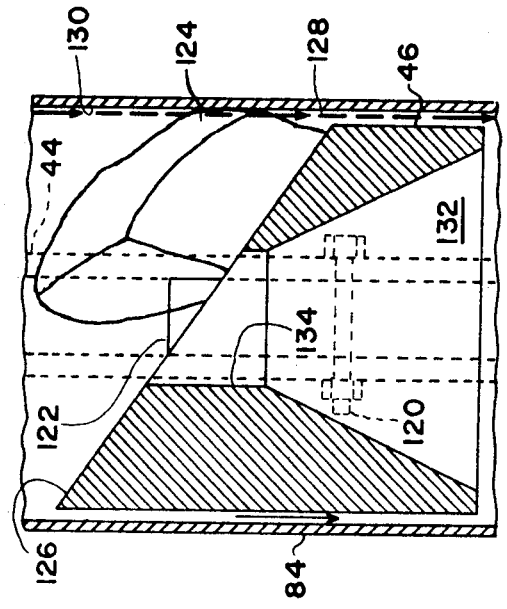
FIG. 8 is a front elevational section of a seed conveyance or cup and a portion of an associated surface providing means with a seed supported on the transversely inclined, bottom surface of the seed conveyance or cup, and a portion of an endless chain or belt of a circulating planting device or elevator on which the cup is conveyed.

Turning now to FIGS. 8 through 12, circulating planting device or elevator 28, in general, and conveyances or cups 46 thereof in particular, will be described. In FIGS. 8 through 10 preferred seed conveyance, cup or bucket 46 is illustrated, whereas in FIGS. 11 and 12 these parts are shown in their respective positions traveling upwardly on chains or belts 44 of planting device 28. In FIG. 9 each cup 46 is secured to chain 44 by a bolt 120 through a lug 122 on cup 46.

As indicated by the arrow in FIG. 8, cup 46 is shown while descending in surface providing discharge tube 84 and approaching planting shoe 37 in the furrow formed thereby. A seed 124 is supported on the inverted, inclined bottom surface 126 of cup 46 and is biased by gravity into sliding engagement with a guide path 128, indicated by dash lines in FIG. 8. Guide path 128 is provided by or contained in a surface 130 of surface providing discharge tube 84 and is in a plane which is parallel and proximate to a second plane containing the furrow center-line in which seeds 124 are to be planted. Surface 130, which is provided by tube 84 by the inside wall thereof and embraces and guides seeds 124 in guide path 128 during their descent, terminates in a seed discharge location, or position 131 at the bottom of planting machine 10. While descending, seeds 124 are conveyed while supported on inclined bottom surfaces 126 of cups 46, the inclination of which is transverse with respect to guide path 128, and biased by gravity, slidably engage embracing surface 130 provided by the inside wall of tube 84. The support provided by cup transverse surface 126 and the surface containing guide path 128, as aforementioned, substantially terminates at discharge location 131 at which position any forces acting transversely to the guide path 128 plane tending to act on seeds 124 supported by bottom surfaces 126 and guided by guide path 128 of surface 130 are negigible or minimal and seeds 124 are guided for controlled, precise deposit or planting one by one from alternate rows in groove 40 in the center of the furrow in a substantially straight line and uniformly spaced in the line.

Again referring to FIGS. 8 through 10, cup 46 will be described as illustrated in FIG. 8 wherein it is shown when traveling downwardly in discharge tube 84 along guide path 128 in surface 130 thereof on chain or belt 44 of circulating planting device 28. Cup 46 is a hollow, open ended oblique cylinder having a frustoconical interior secton 132 into which seeds 124 are loaded when cups 46 circulate upwardly into and through hoppers 34, and an internal cylindrical section 134 communicating therewith which provides means for eliminating extraneous foreign matter or other debris which sometimes gets picked up along with the seed in hoppers 34.

Referring now to FIGS. 11 and 12 the upper portion of planter 10 and planting device 28 will be described. In these drawing figures, upper or return sprocket 48 together with the upper portions of chains or belts 44 and some of the cups 46 with seeds 124 are shown as these elements circulate and pass over and around sprocket 48. In FIG. 12 the preferred dual cup row is illustrated traveling upwardly, cup 46 arranged on chains or belts 44 in staggered constant relation loaded with seeds 124 which were picked up in hoppers 34. As each cup 46 passes around sprocket 48 and begins to reverse direction to travel downwardly, each seed 124 is discharged from each cup 46 onto transversely inclined bottom surface 126 of immediately preceding cup 46.

Immediately below sprocket 48 in FIG. 11, a shaker assembly device 136 is shown, a device which may be beneficially used to eliminate any extra seeds 124 which may have been picked up when cups 46 passed through hopper 34. Ordinarily, however, the present invention which operates at high speed which, when combined with uniform seed, will not require shaker devices. On the other hand, some planting conditions may dictate use of this device and for that reason cup shaker assembly 136 is included. As mentioned previously, shaker assembly 136 is supported on the framework of receptacle 36 below sprocket 48 and above hopper 34 and comprises a shaker wheel 138 (one shown) for each chain 44 which is free to rotate on an axle 140 in an arm or bracket 142 of a bridging member 144. Bridging member 144 extends between chains or belts 44 from a pivot connector 145 to an adjusting rod or crank member 146 to which it is attached. Crank 146 is threadably engaged in upper and lower threaded receivers 148 and 150 respectfully, which are contained in the framing of receptacle 36, and includes on its upper end a crank handle 152. Shaker wheels 138 have a plurality of peripheral, radially extending shaker prongs or cams 154 which receive and engage chains or belts 44, so that the latter when moving thereover causes shaker wheels 138 to rotate and apply a vibration to chains or belts 44, as will be explained hereinafter.

Shaker assembly crank 146 is turned by means of handle 152 which causes wheel 138 to move left or right in the central slot 155 (indicated by double headed arrow below slot 155) as arm 142 and member 144 pivot about connector 145. Shaker wheels 138 are tensioned, increasingly or decreasingly, against chains or belts 44, depending upon the direction in which crank 146 is turned and, as indicated by dash lines in FIG. 11, cause chains or belts 44 and cups 46 to be subjected to a low frequency, high amplitude vibration which is effective to eliminate overloading of cups 46 as they travel upwardly through shaker 136 over wheel 138 and cams 154.

Also in FIGS. 11 and 12, loaded cups 46 after passing through shaker assembly 136, move upwardly to the top of return sprocket 48 at which point they begin to reverse direction and enter a curved or contoured tube 156 which is adjustably mounted thereat adjacent sprocket 48 on the return, or cup reversing side thereof. Contoured tube 156 is attached near its bottom or exit end to the top portion or end of discharge tube 84 on a threaded stud or bolt 158, affixed to tube 156 through a slot 159 in tube 84 and a threaded nut or clamp 160 on stud 158. At the top part of tube 156 mounting members comprising a pair of bolts 161, 162, as seen best in FIG. 12, are used passing through slots 164 in the sides of the upper end of contoured tube 156. It is therefore readily apparent that contoured tube 156 can be adjusted relative to cups 46 as these elements circulate therethrough on chains or belts 44 over sprocket 48 to adjust the clearance between the traveling cups 46 and the inside wall surface of tube 156. It will also be appreciated from FIGS. 11 and 12 that upper or return sprocket 48 is itself positionally vertically adjustable by means of the shaft bolt 49, on which sprocket 48 rotates, in vertical slots 168 and the clamping nuts 166. To adjust the vertical position of upper sprocket 48 and simultaneously increase or decrease the tension in chains or belts 44, clamp nuts 166 are loosened on shaft bolt 49 and sprocket 48 is free to be moved up or down as shaft bolt 49 rides up or down in slots 168.

Contoured tube 156 is preferably semi-circular in construction and has an internal surface contoured to conform to the path swept out by cups 46 in accord with the pattern formed thereby as cups 46 travel around return sprocket 48, best shown in FIG. 11. It is desirable to control the clearance between moving cups 46 and the inside wall surface of contoured tube 156 to insure that seeds 124 when discharged from cups 46 are under control when in free-flight before arriving at the bottom surface of the respective immediately preceding cups 46. To provide for such guidance and control as above described, it will be readily apparent that an adjustable element such as contoured tube 156 is advantageous, not only for use with the cups 46 of the present invention, but also with other machines having conventional cups not having transversely inclined bottoms, since the latter usually also invert to discharge seed to the bottoms of preceding cups. Adjustable tube 156 will provide the same benefits if used with such conventional machines and insure that its seeds arrive at the preceding cup bottoms, as in the present invention, not only under control in free-flight but also in an uncut, unbruised or otherwise undamaged condition.

Referring again to FIG. 4, in particular the left side thereof, there is illustrated another embodiment of the present invention, more specifically an additional circulating planting device 170. Planting device 170 has been found advantageous in seed potato planting wherein two or more rows of seeds, for seed plants, are planted in a single furrow. As seen in FIG. 4, circulator 170 comprises dual chain 44 which circulates about upper and lower sprockets 48, 42, as in the previous embodiment, and carries a plurality of cups or seed conveyances 172. Seed conveyances or cups 172, similarly constructed and similarily secured to belts 44 as cups 46 of the preceding embodiment, have bottom, inclined surfaces 174, which inclination, though opposite in direction or diverging with respect to surfaces 174 of cups 172 in an adjacent row, and to surfaces 126 of cups 46, is also transverse with respect to the furrow. Seeds 124, in this instance supported on inverted, transversely inclined bottom surfaces 174, are biased by gravity into sliding engagement with the guide paths 175 in the opposite sides of surfaces 130 provided by the inside wall of discharge tube 84, and conveyed to discharge location 131 at the bottom of machine 10 and, as in the previously described embodiment, support for seeds 124 terminates at location 131, therefore any forces acting transversely to the guide paths 175 or to the planes containing them tending to act on seeds 124 will be negligible or minimal and seeds 124 will be guided for controlled, precise deposit one by one from alternate rows in substantially straight lines, one on each side of the furrow and uniformly spaced in each line.

It will be appreciated that a special planting shoe 176 has been devised for use with diverging cup planting device or elevator 170 which has a set of internal baffles or gage plates 178 and from which grooving element or frog 41 has been omitted. Though these devices can also be used if desired, it has been found that with baffles or gage plates 178 substantially the same results with respect to placement of seeds 124 in the desired lines are obtained and the center groove 40 need not be provided. In other respects planting device or shoe 176 is the same as planting shoe 37 both with regard to function as well as performance. In addition in this embodiment, planting two rows of seeds in a single furrow at high speed is also possible since cups 172 are arranged in rows on and circulate on planting device 170 in staggered constant relation as in the previously described device shown on the right in FIG. 4.

Figure 14:
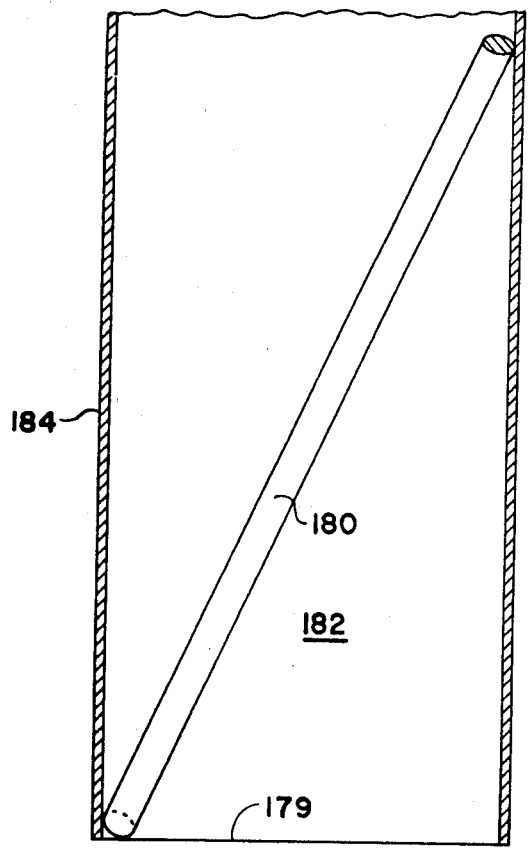
FIG. 14 is a view along the line 14—14 of FIG. 13.
Figure 13:
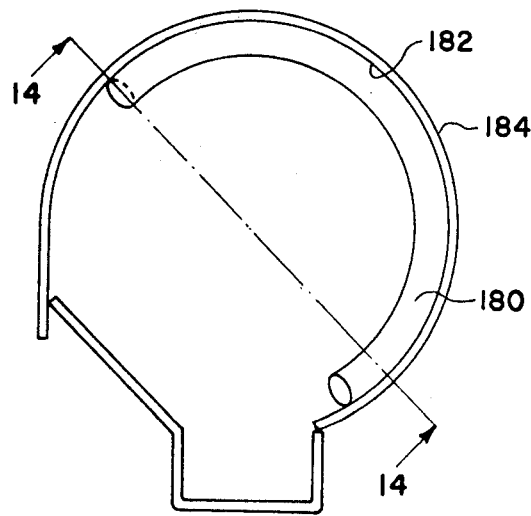
FIG. 13 is a plan view of a surface providing vertical discharge tube of an additional embodiment of the invention wherein one or more helical rods are affixed to the inside surface of the tube to permit the use of conventional seed conveyances or cups.
Figure 15:
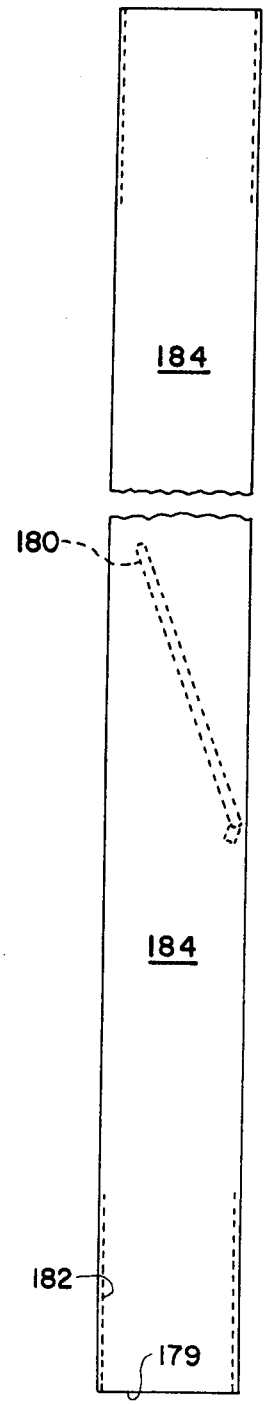
FIG. 15 is an elevation of the surface providing vertical discharge tube of FIG. 13.

Referring now to FIGS. 13, 14 and 15, still another embodiment of the invention is disclosed, in which a seed positioning means is used to insure that seeds are conveyed to a discharge location 179 (similar to location 131) which positioning means comprises one or more helical guides or rods 180 applied to or otherwise affixed to the inside surface 181 of a surface providing vertical discharge tube 182. Guides or rods 180 are formed into rapidly descending, high pitched helices, preferably round in cross-section, and may be continuous or discontinuous, provided that at the bottom of tube 182, i.e., at discharge location 179 they terminate transversely of the furrow or plant row line. It is anticipated that any cup configuration e.g. round bottom cups, frusto-conical cups or any conventional conveyance, which are conveyed in parallel rows in staggered constant relation, can be used with rods 180 since rods 180 position the seeds as they descend in a manner such that when they arrive at location 179 they are in a position transverse with respect to the furrow. Therefore, it will be appreciated that in this instance, as in the previously described preferred embodiment, seeds are guided for controlled deposit and planting in substantially a straight line and uniformly spaced in the line.

In operation, planter 10 is arranged behind a tractor (not shown) on two point hitch 116 and transported to the field for planting supported on swivel or tailing wheels 92. Receptacle 36 is loaded with seeds, cylinder 114 is actuated to lower planter 10 to the ground with planting shoes 37 and plows 38 adjusted by means of turnbuckle 22 to open the furrows to the desired depths at which seeds 124 are to be planted. Drive wheel 12 engages the ground and rotates when drawn by the tractor to rotate sprocket 24 and power sprocket 26 through transmission system 27, thereby driving circulating planting device or elevator 28 including endless chains or belts 44 and cups 46 traveling thereon. Cups 46, in their respective rows, travel upwardly passing into hopper 34 and by virtue of their staggered positions relative to one another in their respective rows on chain 44, cups 46 enter hoppers 34 alternately by row in rather rapid sequence to apply an agitating action to the seeds in hopper 34. By agitating the seeds in this way, seed bridging is prevented, or much reduced as is excess seed loading of cups 46. As loaded cups 46 continue traveling upwardly on chains or belts 44, the latter at some point intermediate upper and lower sprockets 48, 43 pass to and are engaged by shaker wheels 138 of shaker assemblies 136 and are vibrated to further prevent and eliminate any excess seeds 124 from cups 46. After cups 46 on chains 44 pass shaker assemblies 136, they travel or circulate around upper sprockets 48 of circulating planting device or elevator 28 and then enter curved tube 156 adjustably attached adjacent the top of sprocket 48. Each cup 46 in its passage around sprocket 48 and before emerging from contoured tube 146, reverses direction, is inverted and in inverting discharges its seed 124 to inclined bottom surface 126 of immediately preceding cup 46. Tube 156, of semi-circular configuration, has an internal surface contoured to conform to the path swept out by cups 46 when moving around sprocket 48 to thereby control and guide seeds 124 in their free-flight passage from discharge from one cup to the inclined surface 126 of the immediately preceding cup, thereby minimizing or preventing bruising, cutting of, or other damage to seeds 124.

Seeds 124 upon arrival at transverse bottom surfaces 126 of preceding cups 46 are supported thereon, as shown in FIGS. 4 and 8, and are biased by gravity into sliding engagement with guide path 128 in surface 130 provided by the inside wall of vertical discharge tube 84. In this fashion, seeds 124 descent to the bottom of machine 10 to discharge location 131 at which point they are positioned almost directly over groove 40 in the center of the furrow, as cups 46 begin to round lower sprocket 42. As cups 46 continue rounding lower sprocket 42 they emerge from the bottom of discharge tube 84 where the support provided for seeds 124 by cup surfaces 126 terminates. Simultaneously, guide path 128 also terminates, the latter occurring because seed embracing surface 130 provided by tube 84 and in which guide path 128 is contained also terminates. Seeds 124 no longer supported on bottom inclined surfaces 126 of cups 46 and no longer in sliding engagement with guide path 128, that is to say, with seeds 124 arriving at discharge location 131, it will be seen that any forces transverse to guide path 128, or more correctly to a plane containing guide path 128, or to a plane which is proximate and parallel to the guide path containing plane and which also contains the center line (in groove 40) of the furrow, tending to act on seeds 124 are minimized. Seeds 124 are thereby guided under control and deposited in the center line provided by groove 40 of the furrow, alternately by row, one by one from each cup 46 in a straight line and uniformly spaced in the line.

In practice, it is often required that planting operations be carried out in fields in which the ground is uneven. The present invention, by means of flexible frame 16 which is hinged connected on one side to main wheeled frame 18 and in front by enclosure 102 engaging roller 98 of frame 18, provides a solution to this problem. Due to the flexibility of frame 16, which is made possible by its side and front flexible connections, frame 16 moves independently of main frame 18 and rear hinge frame 86. Planting depths can be maintained at constant depth regardless of ground contour for that reason and also for the following reasons; (a) receptacle 36, hoppers 34 and planting devices 28 are fixed in position on frame 16 relative to each other, (b) the position of the latter relative to the ground is controlled by main frame hinges 94 and drive wheel 12, and (c) the position of main frame 18 depends on two-point hitch 116 and rear hinge frame 86 on trailing wheel 92, which due to planting action requires that the tractor pull main frame 18 at two-point hitch 116. Main frame 18 in turn pulls flexible frame 16 by means of roller 98 and hinges 94.

It will also be appreciated by the skilled artisan in practicing the present invention that planter 10, as indicated in FIG. 1, can be equipped to carry the various accessories and appliances by means of which various operations ancillary to planting can be carried out simultaneously with planting. For example, fertilizer materials can be dispensed from a cannister or other convenient dispensing device 186 carried on planter 10 on frame 18, which can be provided with suitable feed conduits 188 to distribute fertilizer directly to the furrows. In general, however, devices of this character are well-known and the skilled worker will undoubtedly be familar with their use and operation. It is therefore believed further description thereof is unnecessary.

What has therefore been described and will hereinafter be claimed as an advance in the art of seed planters, in particular seed potato planters, is a device of the aforementioned character in which two or more rows of seed conveyances, cups or buckets positioned in side by side, staggered, spaced apart constant relation in their respective rows, traveling or circulating in a circulating device or elevator comprising endless chains or belts driven on spaced apart, upper and lower axled sprockets, are adapted to pass upwardly through seed hoppers. The circulating devices or elevators are arranged with respect to or otherwise associated with the hoppers so that the cups enter through the bottoms alternately, by row, in somewhat rapid sequence to agitate the seeds in the hoppers and effectively prevent or minimize seed bridging. The upwardly traveling cups pass through the hoppers and thereafter may be subjected to a shaker mechanism where they are vibrated by a shaker wheel of the shaker mechanism to eliminate any excess seeds which may have been picked up by the cups. The rows of loaded cups then travel around an upper, or return sprocket and enter a semicircular, curved or contoured tube adjustably positioned adjacent the top of the upper sprocket on the return side thereof. The cups as they travel around the upper sprocket are inverted and reverse direction and begin a descending run on the circulating device. As the cups invert the seeds therein are discharged onto the inclined bottom surfaces of the immediately preceding cups, the inclinations of which are transverse with respect to the center line of a furrow formed by furrow opening device carried on the machine. The transversely inclined bottom surfaces of the cups in one row in one embodiment of the invention converge with respect to the surfaces of the cup in an adjacent row. In another embodiment, particularly in those instances in which two rows of seeds are desired to be planted in a single furrow, the cups have diverging transversely inclined bottom surfaces.

The curved tube at its lower end connects with a surface providing vertical discharge tube which embraces and guides the seeds carried on the bottoms of the conveyances or cups and which terminates in seed discharge location at the bottom of the machine in a planting shoe which forms or opens the furrow. The surface provided by the discharge tube has a guide path with which the seeds, biased by gravity, are slidably engaged in their descent to the discharge location supported on the inclined bottom cup surfaces. The inclination of the cup surfaces on which the seeds are supported in transverse to the guide path and the latter is contained in a plane which contains the furrow center line or in a plane which is parallel and proximate to such plane, the axis of circulation of the cups being perpendicular to the latter plane. The planting shoe carries a grooving device or frog which forms a V-shaped groove in the center and bottom of the furrow and the discharge location is immediately above and slightly to the rear of the center groove therein. The support provided by the cup bottoms also terminates at the discharge location and consequently any forces transverse to the guide path plane tending to act on the seed supported by each of the seed cups and guided by the guide path are minimized, so that the seed is guided for controlled deposit in the V-groove in a substantially straight line and uniformly spaced therein.

Also included in the present invention, in combination with the above, is a novel size adjustable receptacle for the seeds, the operation of which in addition to planting in two or more crop rows also permits of varying the distances or spacings between the crop rows. With respect to the latter aspect, it is well-known that crop row spacings are not standardized. Therefore, it is important that a planting machine be capable of planting in any location regardless of crop row spacing variations. In the present invention each hopper is connected to the receptacle on one or more sides, and to each other by a folding floor and carries a planting device including a furrow opening shoe. The receptacle has extendible front and rear walls each comprising a pair of fixed plates and a connector or extension plate. The receptacle and its hoppers are attached to the planter frame by releasable clamps which, when released, permits the hoppers to be moved from side to side, either toward one another to decrease (contract) the size of the receptacle, the front and rear walls extending and retracting and the floor folding and unfolding. Simultaneously the distance between hoppers, and therefore between planting shoes which corresponds to the distance between crop rows is decreased or increased.

The invention is also adapted to contain fertilizer dispensing equipment and the like, operatively mounted on the frame or on any other convenient place. In addition, other devices, for example, crop row marking elements or members, can also be installed on and operated by the planter. For example, in FIGS. 5 and 6 a crop row marker 190 is shown which comprises a rotating disc 192 on the end of a foldable, laterally extending boom or arm 194 which is lowered to the ground to mark a row and raised on the boom 194 when the planter is not in operation.

What is claimed is:

1. A machine for setting seeds including a circulating planting device having a seed discharge tube, one end of which terminates in a seed discharge location at the bottom of the machine, which location in the field operation of the machine is positioned immediately above and is moved substantially parallel to the center-line of a furrow in which seeds are to be planted, said planting device being driven on upper and lower supporting shafts and having seed conveyances mounted thereon in at least one row, and a seed receptacle associated with said planting device, said conveyances each having an open top into which seed is loaded as said conveyances pass upwardly through said seed receptacle, each loaded conveyance thereafter passing around an associated upper one of said shafts, and reversing direction and being inverted, enters said discharge tube and drops its seed up on the bottom surface of the immediately preceding inverted conveyance therein, upon which bottom surface the seed descends supported by the interior wall of said discharge tube to said seed discharge location, said conveyances each having an inclined bottom surface and being so mounted on said planting device that at said seed discharge location said inclination is transverse with respect to the furrow whereby the seed supported thereon is guided for controlled deposit thereof in the furrow.

2. A machine as specified in claim 1 including a contoured tube mounted on the machine in seed conveyance receiving relation adjacent said upper shafts extending from a point where said conveyances begin to reverse direction to a point where said conveyances have completed their inversion, said contoured tube having an internal shape substantially conforming to the path swept by said conveyances as they pass around said associated upper shaft, and means for adjustably positioning said tube relatively to said conveyances to adjust the clearance between said conveyances and the interior surface of said tube.

3. A machine as specified in claim 1 wherein said seed conveyances are mounted on said circulating planting device in at least two separate rows, said conveyances in one row being in fixed staggered relation with respect to said conveyances in an adjacent row, wherein a separate contoured tube for each row of conveyances is mounted on the machine is seed conveyance receiving relation adjacent said upper shafts extending from a point where said conveyances have completed their inversion, each of said contoured tubes having an internal shape substantially conforming to the path swept by said conveyances associated therewith as they pass around said one of said upper shafts, and means for adjustably positioning each of said tubes relatively to said associated conveyances to adjust the clearance between said associated conveyances and the interior surface of said tube, wherein the seeds supported by said bottom surfaces of said conveyances in the separate rows are planted in the furrow alternately one by one from a conveyance in one row and a conveyance in another row, and wherein the transversely inclined bottom surfaces of the seed conveyances in each row converge with respect to the corresponding surfaces of said conveyances of said adjacent row whereby said bottom surfaces of said conveyances guide the seeds supported thereby for controlled deposit, uniformly spaced, in a straight line in the furrow.

4. A machine as specified in claim 1 wherein the seed conveyances are mounted on said circulating planting device in at least two separate rows, said conveyances in one row being in fixed staggered relation with respect to said conveyances in an adjacent row, wherein a separate contoured tube for each row of conveyances is mounted on the machine in seed conveyance receiving relation adjacent said upper shafts exending from a point where said conveyances begin to reverse direction to a point where said conveyances have completed their inversion, each of said contoured tubes having an internal shape substantially conforming to the path swept by said conveyances associated therewith as they pass around said one of said upper shafts, and means for adjustably positioning each of said tubes relatively to said associated conveyances to adjust the clearance between said associated conveyances and the interior surface of said tube, wherein the seeds supported by said bottom surfaces of said conveyances in the separate rows are planted in the furrow alternately one by one from a conveyance in one row and a conveyance in another row, and wherein the transversely inclined bottom surfaces of the seed conveyances in each row diverge with respect to the corresponding surfaces of the conveyances in said adjacent row whereby the bottom surfaces of the conveyances guide the seeds supported thereby for controlled deposit in two rows in the same furrow, one row on each side of the furrow.

5. A cup-like seed conveyance for a vertical circulating planting machine having a seed discharge position at the bottom thereof that in the operation of the machine is moved immediately above and along the length of a furrow in which seeds are to be planted, and on which conveyance a seed is supported on the bottom surface thereof in its descent to the seed discharge position, said conveyance being characterized in that the bottom surface thereof is inclined transversely with respect to the direction of movement of the machine in its planting operation.

6. A seed conveyance for a vertical circulating potato planting machine in which a seed is supported on the bottom surface of said conveyance in its descent to a discharge position at the bottom of the machine for planting in a furrow characterized by the provision of a bottom surface for said conveyance that is inclined transversely with respect to the direction of the furrow for guiding the seed into a desired position in the furrow.

* * * * *